(12) United States Patent
Sun

(10) Patent No.: US 7,450,187 B2
(45) Date of Patent: Nov. 11, 2008

(54) LIQUID CRYSTAL SHUTTER DEVICE FOR A CAMERA

(75) Inventor: Wen-Hsin Sun, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 234 days.

(21) Appl. No.: 11/440,389

(22) Filed: May 24, 2006

(65) Prior Publication Data
US 2007/0115211 A1 May 24, 2007

(30) Foreign Application Priority Data
Nov. 23, 2005 (CN) .................. 2005 1 0101764

(51) Int. Cl.
G02F 1/13 (2006.01)
G03B 7/083 (2006.01)
G03B 7/093 (2006.01)

(52) U.S. Cl. .................................. 349/2; 396/249

(58) Field of Classification Search .............. 349/149, 349/2; 345/50–54; 396/249
See application file for complete search history.

(56) References Cited

U.S. PATENT DOCUMENTS

| | | | | |
|---|---|---|---|---|
| 4,927,242 A | * | 5/1990 | Aoki et al. ................ 349/3 |
| 5,150,226 A | * | 9/1992 | Takanashi et al. .......... 358/471 |
| 5,694,188 A | * | 12/1997 | Sano et al. ................. 349/139 |
| 6,377,327 B1 | * | 4/2002 | De Koning ................ 349/153 |
| 6,439,731 B1 | * | 8/2002 | Johnson et al. ............. 362/29 |
| 6,665,026 B2 | * | 12/2003 | Chen et al. ................. 349/74 |
| 6,697,060 B1 | * | 2/2004 | Tsuchiya .................... 345/212 |
| 2002/0003571 A1 | * | 1/2002 | Schofield et al. ........... 348/148 |
| 2005/0036082 A1 | * | 2/2005 | Lai ............................ 349/61 |

FOREIGN PATENT DOCUMENTS

| | | |
|---|---|---|
| CN | 85108772 A | 9/1986 |
| CN | 1032182 A | 4/1989 |

* cited by examiner

Primary Examiner—Frank G Font
Assistant Examiner—Jerry Blevins
(74) Attorney, Agent, or Firm—Steven M. Reiss

(57) ABSTRACT

A liquid crystal shutter (100) and a camera (200) with therein. The liquid crystal shutter (100) includes a power supply (10), a switch (20) and a liquid crystal box (40), all parts are electrically connected and form a control circuit. The liquid crystal box (40) includes a first electric plate (42), a first polarizing filter (424), a second electric plate (44), and a second polarizing filter (444). A predetermined amount of liquid crystal (46) is contained between the first electric plate (42) and the second electric plate (44). The first polarizing filter (424) is formed on a surface of the first electric plate (42). A second polarizing filter (444) is formed on a surface of the second electric plate (44). The axial direction of the second polarizing filter (444) is perpendicular to that of the first polarizing filter (424).

12 Claims, 4 Drawing Sheets

LIQUID CRYSTAL SHUTTER DEVICE FOR A CAMERA

TECHNICAL FIELD

The present invention relates to shutters for cameras and, more particularly, to a liquid crystal shutter device for a camera.

BACKGROUND

In recent years, cameras, and more particularly, digital cameras have become more and more widely used. A typical digital camera is equipped with a shutter, a silver halide film or an image sensor such as a charge coupled devices (CCD) or complementary metal-oxide semiconductor (CMOS) sensor, which is exposed automatically at a predetermined shutter speed.

In some case, where a photographer wants to take photo of an object moving at high speed, the shutter speed of the camera needs to be quite high, since otherwise the film or image sensor will become over-exposed, which can lead to an unclear picture.

A conventional camera adopts a mechanical shutter, which uses a relatively complex arrangement of spring, cam and gear to control the speed of the shutter. However, the shutter speed of the camera is limited because it takes some time for the gear to drive the cam.

Therefore, a shutter for a camera with high shutter speed with a simple configuration is desired in order to overcome the above-described shortcomings.

SUMMARY

In one embodiment thereof, a liquid crystal shutter device for a camera, includes a power supply, a switch, and a liquid crystal box. The liquid crystal box is connected to the power supply and the switch. The liquid crystal box includes a first electric plate, a first polarizing filter, a second electric plate, and a second polarizing filter. The first electric plate includes a first base and a first electroplated layer coating the first base. The second electric plate includes a second base and a second electroplated layer coating the second base. The first base, the first electroplated layer, the second base, and the second electroplated layer, are all transparent. A predetermined amount of liquid crystal is contained between the first and the second electric plates. The first polarizing filter is formed on a surface of the first electric plate. The second polarizing filter is formed on a surface of the second electric plate. The axial direction of the second polarizing filter is perpendicular to that of the first polarizing filter. The power supply, the switch, and the liquid crystal box are electrically connected in series and form a control circuit.

Other advantages and novel features will become more apparent from the following detailed description when taken in conjunction with the accompanying drawings.

BRIEF DESCRIPTION OF THE DRAWINGS

Many aspects of the liquid crystal shutter device for a camera can be better understood with reference to the following drawings. The components in the drawings are not necessarily drawn to scale, the emphasis instead being placed upon clearly illustrating the principles of the present liquid crystal shutter device for a camera and its potential applications. Moreover, in the drawings, like reference numerals designate corresponding parts throughout the several views.

DETAILED DESCRIPTION OF THE PREFERRED EMBODIMENT

Figure 1:
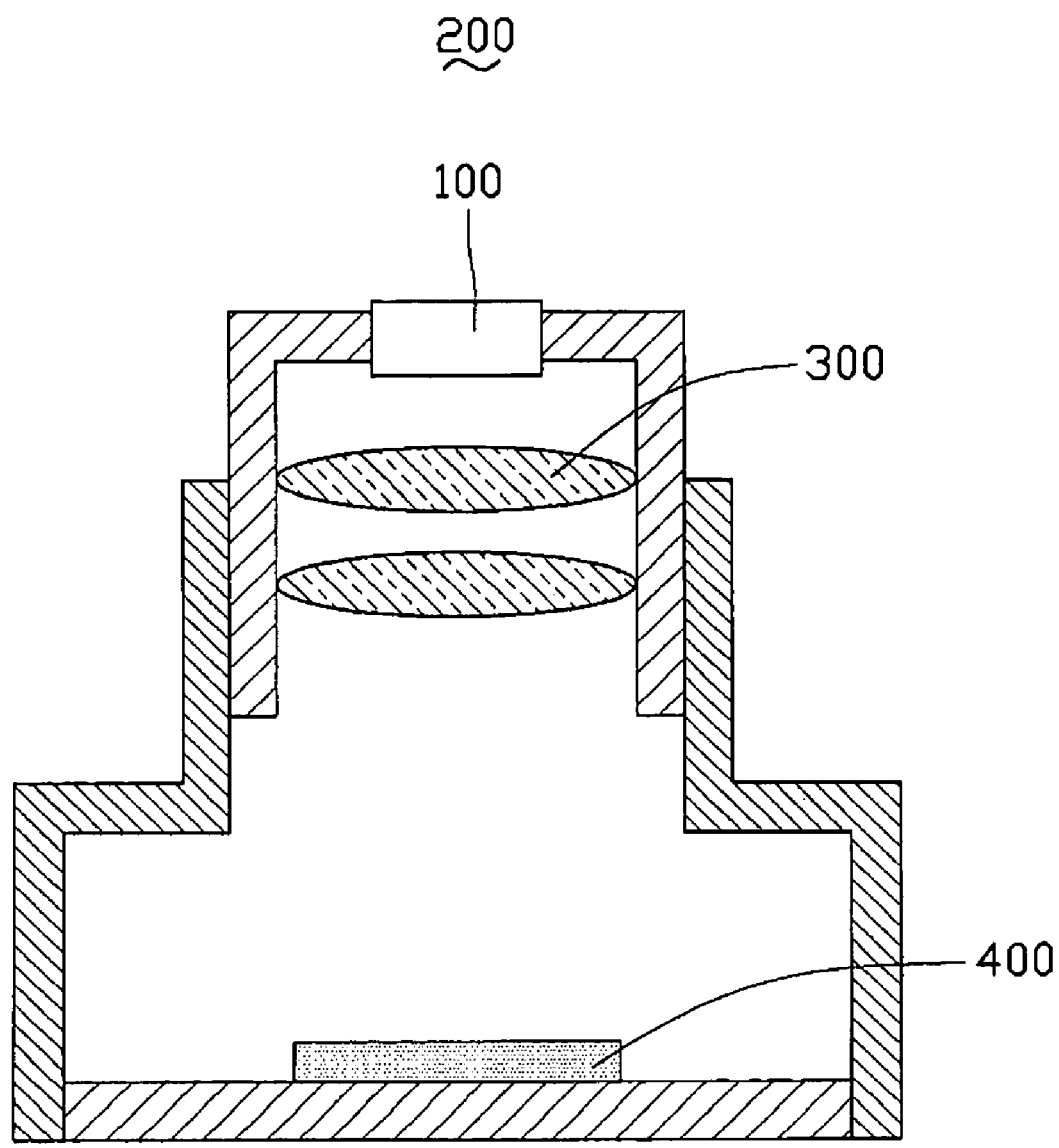
FIG. 1 is a schematic view of a camera, according to one embodiment of the present invention, the camera includes a liquid crystal shutter device.

Referring to FIG. 1, in a preferred embodiment, a liquid crystal shutter device 100 is applied to a camera 200. The camera includes a lens 300 and a plate 400 such as film or image sensor. Light 50 can pass through the liquid crystal shutter device 100, the lens, and reach the plate 400, thus exposing the plate 400.

Figure 2:
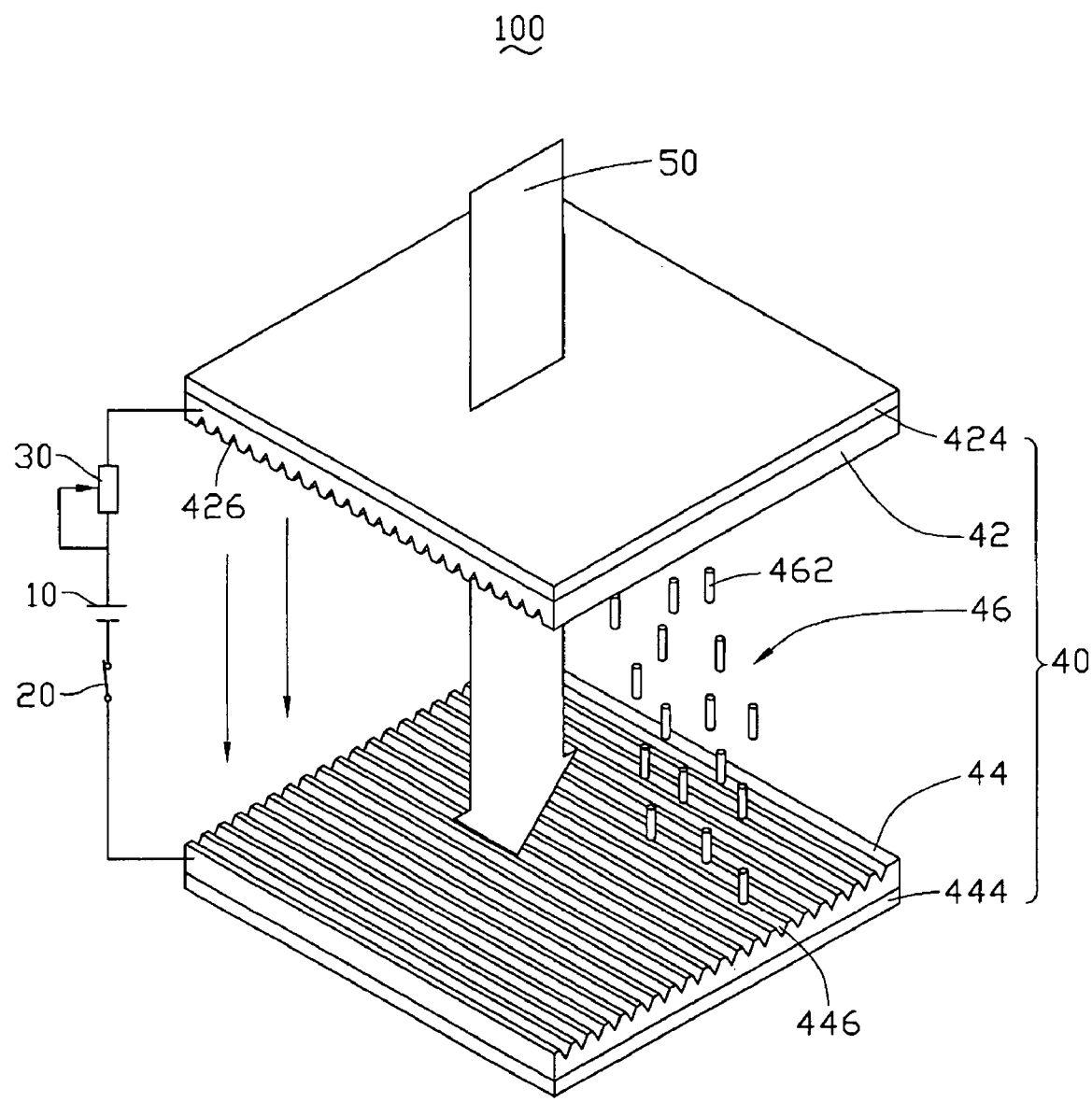
FIG. 2 is a schematic view of a liquid crystal shutter device for a camera shown in FIG. 1, showing the switch closed, according to one embodiment of the present invention, the liquid crystal shutter comprising first and second electric plates, and first and second polarizing filters.

Referring to FIG. 2, in this preferred embodiment, the liquid crystal shutter device 100 includes a power supply 10, a switch 20, a rheostat 30, and a liquid crystal box 40, all parts being electrically connected so as to form a control circuit. The power supply 10 supplies a certain voltage, and the rheostat 30 can change the voltage across the liquid crystal box 40 by changing its resistance in the circuit. The switch 20 is closed except when photos are being taken. The exposure time of the camera is controlled by the time during which the switch 20 is in the 'off' position.

The liquid crystal box 40 includes a first electric plate 42, a second electric plate 44, and a predetermined amount of liquid crystal 46 contained between the first electric plate 42 and the second electric plate 44.

Figure 3:
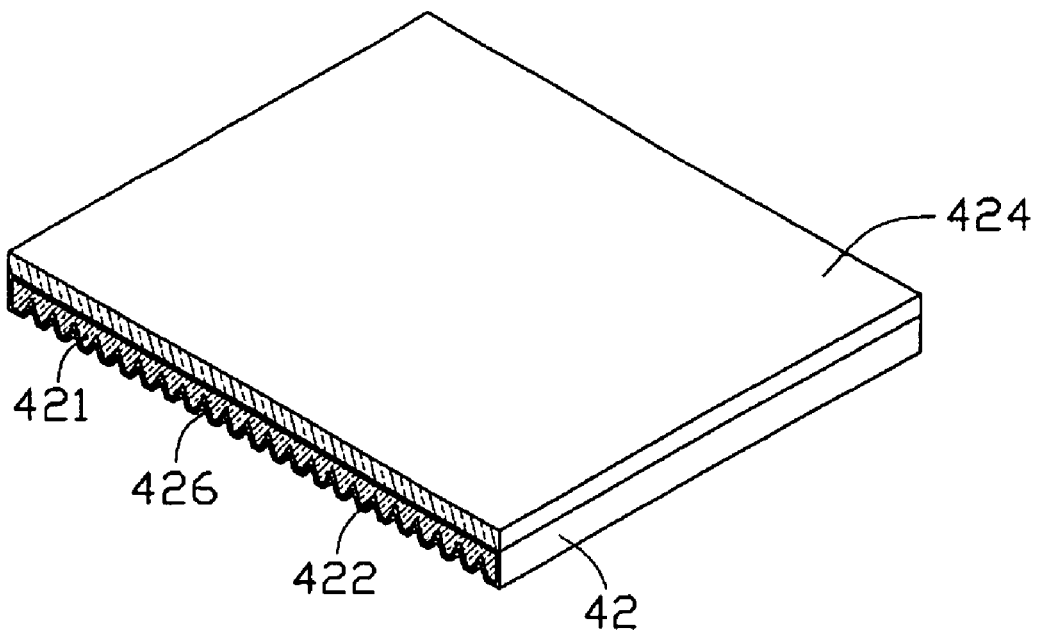
FIG. 3 is a schematic view of the first electric plate and the first polarizing filter shown in FIG. 2.

Referring also to FIG. 3, the first electric plate 42 includes a first base 421 and a first electroplated layer 422. The first base 421 is coated with the first electroplated layer 422. The first electric plate 42 has two surfaces, one surface being coated with a first polarizing filter 424, the opposite surface defining a plurality of first parallel grooves 426. The direction of the axis of the first polarizing filter 424 is the same as the direction of the parallel grooves 426 of the first electric plate 42.

Figure 4:
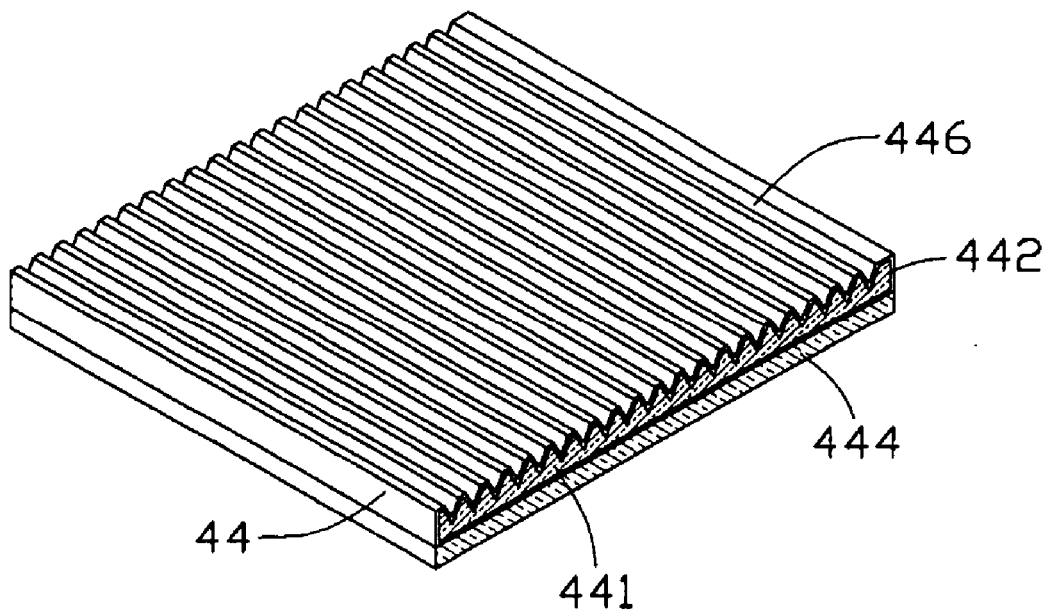
FIG. 4 is a schematic view of the second electric plate and the second polarizing filter shown in FIG. 2.

Referring also to FIG. 4, the configuration of the second electric plate 44 is similar to that of the first electric plate 42, including a second base 441 and a second electroplated layer 442. The second base 441 is coated with the second electroplated layer 442. The second electric plate 44 also has two surfaces, one surface is coated with a second polarizing filter 444, and the opposite surface defines a plurality of second parallel grooves 446. The optical axis of the second polarizing filter 444 is the same as the direction of the second parallel grooves 446 of the second electric plate 44. However, the optical axis of the second polarizing filter 444 is perpendicular to that of the first polarizing filter 424, while the direction of the second parallel grooves 446 is perpendicular to that of the first parallel grooves 426.

The first and second bases 421, 441 are made of a transparent material, such as glass. The first and second electroplated layers 422, 442 are transparent and can be made of an oxide of indium and tin, which is called ITO film. An electric field may be formed between the first electric plate 42 and the second electric plate 44 when the control circuit is switched on.

The liquid crystal 46 is in a mesomorphic state. The liquid crystal 46, composed of a substance such as, for example, lithium niobate ($LiNbO_3$), lithium molybdate ($Li_2MoO_4$) and potassium dihydrogen phosphate ($KH_2PO_4$), is nematic phase and the direction of the liquid crystal molecule is controlled by the electric field formed between the first electric plate 42 and the second electric plate 44. The direction of the liquid crystal molecules 462 in the first parallel grooves 426 of the first electric plate 42 is the same as the direction of the first parallel grooves 426, as is the direction of liquid crystal molecules 462 in the second parallel grooves 446 of the second electric plate 44. Therefore, the orientation of the liquid crystal molecules 462 near the first electric plate 42 is perpendicular to that of the second electric plate 44.

When the switch 20 is closed, an electric field is formed between the first electric plate 42 and the second electric plate 44, thus changing the orientation of the liquid crystal molecules 462 between the first electric plate 42 and the second electric plate 44. If the strength of the electric field is large enough, the arrangement of the liquid crystal molecules 462 will align parallel to the direction of the electric field. The rays of light 50 with polarization direction in the same direction as the optical axis of the first polarizing filter 424, passes through the first electric plate 42, the liquid crystal 46 and the second electric plate 44 in that order, then reaches the second polarizing filter 444. Since the polarization direction of the incident light rays are perpendicular to that of the second polarizing filter 444, the light rays can not go through the second polarizing filter 444 and reach the film or the image sensor in the camera.

Figure 5:
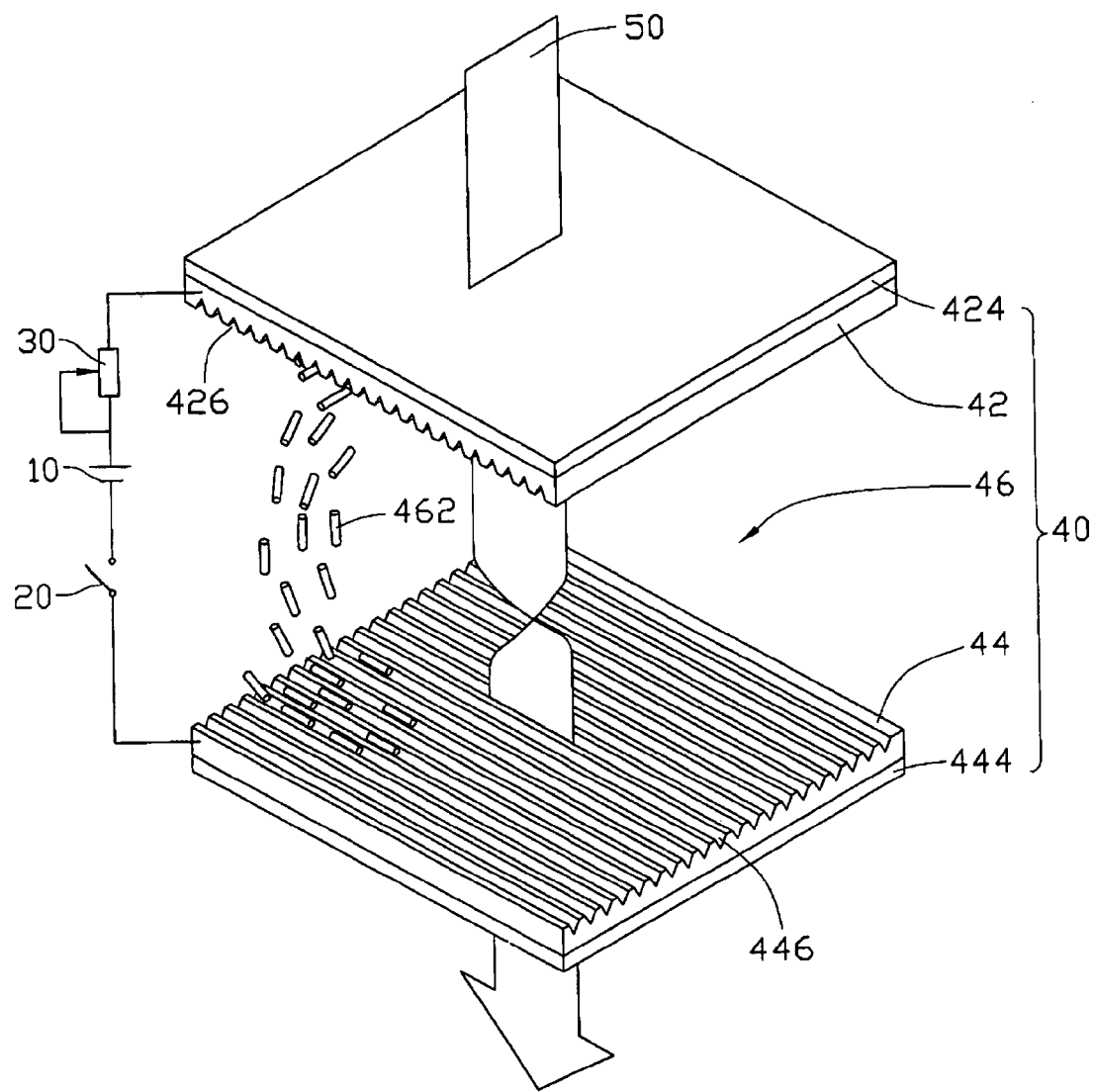
FIG. 5 is similar to FIG. 2, but showing the switch in the 'off' position.

Referring to FIG. 5, when the switch 20 is broken, the electric field between the first electric plate 42 and the second electric plate 44 disappears immediately The direction of orientation of the liquid crystal 46 molecules in the first parallel grooves 426 of the first electric plate 42 is the same as that of the first parallel grooves 426 of the first electric plate 42, as is the arrange direction of the liquid crystal 46 molecules in the parallel grooves 446 of the second electric plate 44. It is easy to understand that the direction of orientation of the liquid crystal 46 molecules in the first parallel grooves 426 of the first electric plate 42 is perpendicular to that of the liquid crystal 46 molecules in the second parallel grooves 446 of the second electric plate 44. The direction of the liquid crystal molecules 462 between the first electric plate 42 and the second electric plate 44 is gradually changed, and the direction of the liquid crystal molecules 462 revolves 90 degrees from top to bottom.

The ray, whose polarization direction is the same as the optical axis of the first polarizing filter 424, passes through the first electric plate 42, the liquid crystal 46, and the second electric plate 44 in that order. The polarization direction of the light rays is changed by the liquid crystal 46 gradually, and the polarization direction of the light rays is eventually revolved 90 degrees from top to bottom. So the rays can pass through the second polarizing filter, the lens 300, and reach the plate 400 in the camera 200, thus exposing the plate 400.

According to the change of the resistance of the rheostat 30, the voltage between the first electric plate 42 and the second electric plate 44 changes also, and the liquid crystal 46 molecules become irregularly arranged. The degree of exposure of the plate 400 is controlled by the strength of the electric field between the first electric plate 42 and the second electric plate 44.

It should be understood that the power supply 10 can be drawn from the main power source of the camera. Furthermore, the voltage difference between the first and the second electric plate 42, 44 may be between 0 volts to 5 volts. It is also to be understood that the liquid crystal shutter device 100 can be used in a common camera, in a digital camera, or in any circumstance requiring a fast response-time light shutter.

It is believed that the present embodiments and their advantages will be understood from the foregoing description, and it will be apparent that various changes may be made thereto without departing from the spirit and scope of the invention or sacrificing all of its material advantages, the examples here before described merely being preferred or exemplary embodiments of the invention.

What is claimed is:

1. A liquid crystal shutter device for a camera, comprising:
   a power supply;
   an image recording plate;
   a switch having first and second positions, wherein when the switch is in one of its positions, light is allowed to enter the camera through the shutter device to be recorded on the image recording plate, and when the switch is in its other position, light is prevented from entering the camera through the shutter device and being recorded on the image recording plate;
   a liquid crystal box connected to the power supply and the switch, the liquid crystal box including:
      a first electric plate, including a first transparent base and a first transparent electroplated layer, the first base being coated with the first electroplated layer;
      a first polarizing filter formed on a surface of the first electric plate;
      a second electric plate parallel to the first electric plate, the second electric plate including a second transparent base and a second transparent electroplated layer, the second base being coated with the second electroplated layer;
      a second polarizing filter, the axial direction of the second polarizing filter being perpendicular to that of the first polarizing filter, the second polarizing filter being formed on a surface of the second electric plate; and
      a predetermined amount of liquid crystal contained between the first electric plate and the second electric plate;
   wherein the power supply, the switch, and the liquid crystal box are electrically connected in series and form a control circuit.

2. The liquid crystal shutter device as claimed in claim 1, wherein the first and second bases are made of glass.

3. The liquid crystal shutter device as claimed in claim 1, wherein the first and second electroplated layers are made of an oxide of indium and tin.

4. The liquid crystal shutter device as claimed in claim 1, wherein the liquid crystal shutter device further comprises a rheostat capable of adjusting the voltage difference between the first electric plate and the second electric plate.

5. The liquid crystal shutter device as claimed in claim 1, wherein the liquid crystal is made of nematic phase material.

6. The liquid crystal shutter device as claimed in claim 5, wherein the liquid crystal is selected from the group consisting of lithium niobate, lithium molybdate, and potassium dihydrogen phosphate.

7. A camera comprising:
   a lens module; and
   a liquid crystal shutter located in front of the lens module, the liquid crystal shutter including:
      a power supply;

a switch;

a liquid crystal box connected to the power supply and the switch, the liquid crystal box including:

a first electric plate having a plurality of first parallel grooves defined therein;

a first polarizing filter formed on a surface of the first electric plate, an extending direction of the first parallel grooves of the first electric plate being the same as an axial direction of the first polarizing filter;

a second electric plate parallel to the first electric plate, the second electric plate having a plurality of second parallel grooves defined therein, an extending direction of the second parallel grooves being perpendicular to that of the first parallel grooves;

a second polarizing filter, the axial direction of the second polarizing filter being perpendicular to that of the first polarizing filter, the second polarizing filter being formed on a surface of the second electric plate; and a predetermined amount of liquid crystal contained between the first electric plate and the second electric plate;

wherein the power supply, the switch, and the liquid crystal box are electrically connected in series and form a control circuit, and wherein the control circuit further includes a rheostat capable of adjusting the voltage between the first electric plate and the second electric plate.

8. The camera as claimed in claim 7, wherein at least one of the first and second electric plates comprises a base and an electroplated layer, the base being coated with the electroplated layer.

9. The camera as claimed in claim 8, wherein the electroplated layer is made of an oxide of indium and tin.

10. A liquid crystal shutter device for a camera, comprising;

a first transparent electric plate with a plurality of first parallel grooves formed in one surface thereof;

a first transparent polarizing filter formed an opposite surface of the first electric plate, the first polarizing filter having a first optical axis parallel to the first grooves;

a second transparent electric plate spaced from and parallel to the first electric plate, the second electric plate having a plurality of second parallel grooves formed in one surface thereof, the second grooves being substantially perpendicular to the first grooves, the surfaces of the first and second electric plates that form the first and second grooves facing each other;

a second transparent polarizing filter formed on an opposite surface of the second electric plate, the second polarizing filter having a second optical axis parallel to the second grooves;

a predetermined amount of liquid crystal molecules contained between the first electric plate and the second electric plate; and a switch circuit connected to the first and second electric plates so as to selectively establish an electric field between the first and second electric plates for changing a direction of the liquid crystal molecules, thereby selectively allowing the rays of light to pass through and stopping the rays of light from passing trough the first and second polarizing filters.

11. The liquid crystal shutter device as claimed in claim 10, wherein the liquid crystal shutter device further comprises a rheostat capable of adjusting the voltage difference between the first electric plate and the second electric plate.

12. The liquid crystal shutter device as claimed in claim 10, wherein the liquid crystal is made of nematic phase material.

\* \* \* \* \*